S. D. WALDON.
HYDROCARBON MOTOR.
APPLICATION FILED JAN. 29, 1916.
1,283,991. Patented Nov. 5, 1918.
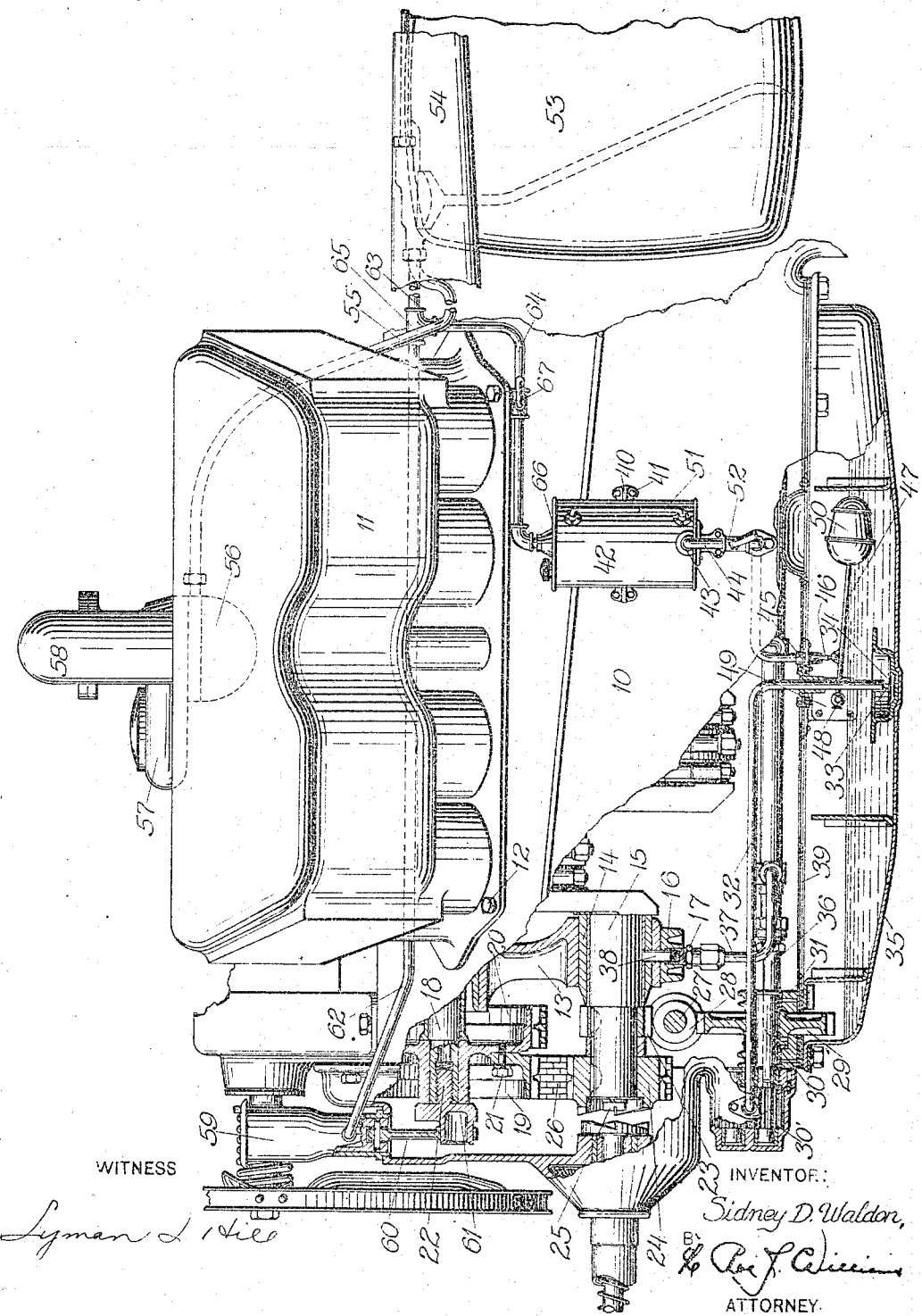
WITNESS
Lyman L. Hice
INVENTOR:
Sidney D. Waldon,
BY
H. Roe L. Williams
ATTORNEY.

UNITED STATES PATENT OFFICE.

SIDNEY D. WALDON, OF DETROIT, MICHIGAN, ASSIGNOR TO CADILLAC MOTOR CAR COMPANY, OF DETROIT, MICHIGAN, A CORPORATION OF MICHIGAN.

HYDROCARBON-MOTOR.

1,283,991.

Specification of Letters Patent.

Patented Nov. 5, 1918.

Application filed January 26, 1916. Serial No. 74,965.

*To all whom it may concern:*

Be it known that I, SIDNEY D. WALDON, a citizen of the United States, and resident of Detroit, Wayne county, State of Michigan, have invented certain new and useful Improvements in Hydrocarbon-Motors, of which the following is a specification.

This invention relates to hydrocarbon motors, and particularly to automatic means for preventing the continued operation of motors of this type under certain abnormal conditions, such as when the supply of lubricant becomes low.

To obtain maximum efficiency of operation, and a minimum wear of parts in machinery of all types, it is, of course, necessary that all relatively moving parts shall be properly lubricated; on the other hand, it is highly undesirable to operate machinery, particularly of the high speed type, such as the modern multicylinder internal combustion engines used in motor cars, unless their parts are properly lubricated.

Therefore, one of the objects of this invention is to provide means for causing a prime mover to become inoperative under certain undesirable operating conditions, such as when the supply of lubricant goes below normal.

In a preferred embodiment, which will be described herein, as applied to an internal combustion engine, I have provided means for cutting off the source of motive power which, in this case, is a hydrocarbon fuel, when the lubricant supply is not normal. It will be understood that this object may be effected by reducing the pressure in the fuel tank, or cutting off the pressure entirely, in systems where a pressure feed is used from the tank to the carbureter; or where a vacuum feed is used, the vacuum may be decreased in a similar way, when the lubricant supply goes below normal, or the lubricant is not being properly circulated.

Another object is to provide an internal combustion engine with interdependent sources of fuel and lubricant supplies, having automatic means for discontinuing the feed from one of said sources under certain conditions of said other source.

These, and other objects, will appear from the following description, taken in connection with the accompanying drawing, which forms a part of this specification, and in which is illustrated a side elevation, with portions broken away, of a hydrocarbon motor power plant and its fuel supply system.

Referring to the drawing, 10 represents a motor base or crank case, on which may be mounted in suitable V relation, a plurality of cylinder blocks 11, as by bolts 12. The crank case is provided with downwardly extending lugs 13, in which may be suitably arranged bearings 14 for a crank shaft 15, which is adapted to be secured in position, as by caps 16 and bolts 17.

The well known valve cam shaft is illustrated at 18 as also mounted in the crank case, and is provided with a plurality of gears 19 and 20 secured together, as by bolts 21, and adapted to be secured to said cam shaft, as by a bolt 22. A pair of gears 23 and 24 are arranged on the front end of the crank shaft and secured in position, as by a bolt 25. The gear 24 may be connected to the gear 19 on the cam shaft, for driving the latter, as by a chain 26. Suitably arranged in the crank case 10, below the crank shaft 15, and transversely thereto, is a shaft 27 having a gear 28, adapted to be driven from the gear 23, and to drive the gear 29 on a shaft 30 in bearings 31 in the crank case. The gear 29 is adapted to drive an oil pump 30' which may be arranged on the front end of the crank case, and the intake of which is adapted to be connected with an intake conduit 32, the open end 33 of which is adapted to extend to the oil sump 34 formed in the bottom cover 35 of the crank case 10. A discharge or distributing conduit 36 leads from the oil pump to various parts of the motor and is adapted to lubricate the same, as by risers 37, which may communicate with ports 38 for lubricating the bearings 14 of the crank shaft 15.

Of course it will be understood that any lubricant which flows from the bearings will drain through the screen 39 back into the oil sump 34, from which it will be redistributed to the various parts of the motor.

Suitably arranged, such as at the side of the crank case and secured thereto, as by lugs 40 and bolts 41, is a supplementary oil tank 42, which is provided adjacent its lower end with a port 43, from which lubricant may be fed, as by a conduit 44, having an outlet port 45 arranged adjacent the sump 34. An automatic valve mechanism, comprises a conically shaped or needle valve member 46 pivotally mounted on an actuating lever 47, one end of which may be pivoted as at 48 to a plate 49 arranged in the crank case, and its other end may be provided with a float 50, adapted to be actuated by variations of the level of the lubricant in the crank case. The tank 42 may be provided with the usual gage glass 51 and the flow of lubricant from the tank may be controlled by a suitable cock 52 arranged in the conduit 44. The feed from the tank may be by gravity or pressure, and is adapted to replenish the supply in the crank case as it is consumed during the operation of the motor so that a constant level is maintained.

A fuel tank 53, which may be suitably swung from the frame members 54, is connected by means of a conduit 55 to the float chamber 56 of a carbureter 57 arranged between the branches of an intake 58. As the fuel tank is arranged below the level of the float chamber, means are provided for feeding gasolene to the carbureter, as by means of an air pump 59, of the well known reciprocating type, arranged at the front end of the motor, and adapted to have its pitman 60 driven from a crank 61, mounted on the end of the cam shaft 18. The air is led from the pump by means of conduits 62 and 63 to the tank 53. It will be noted that another conduit 64 is led into the T union 65, connecting the conduits 62 and 63, and is adapted to communicate with the interior of the tank 42 adjacent its top 66.

From the foregoing description, it will be understood that when the supplementary oil tank 42 contains a supply of lubricant, it will automatically replenish the diminishing supply of lubricant in the crank case and the oil in the tank 42 will act as a liquid seal, preventing the discharge of air from the fuel pressure system; and under such conditions, the pump 59 will maintain sufficient pressure to feed gasolene from the tank 53 to the float chamber 56 of the carbureter; however, when the oil supply in the supplementary tank is exhausted, the needle valve 46 having opened the port 45 in the conduit 44, the pressure in the air lines feeding to the tank 53 will be released therefrom, through the tank 42, conduit 64 and tank 42 and conduit 44 to the crank case, which will result in the stopping of the motor. Of course if it is desired to run the motor after the operator has been warned that his supplementary supply of lubricant has been exhausted, this may be done by shutting off a cock 67 in the conduit 64 leading to the tank 42.

While I have shown my invention as applied to the supplementary oil feed of an internal combustion engine, it will be understood that this is merely an illustrated embodiment.

While I have described and will specifically claim a preferred form of my invention, it will, of course, be understood that various modifications may be made, by one skilled in the art, without departing from the spirit and scope thereof.

Having thus described my invention, what I claim and desire to secure by Letters Patent is:

1. In a hydrocarbon motor, the combination with a carbureter, a source of fuel supply arranged at a lower level than said carbureter, means for lifting fuel from said source to said carbureter, and a lubricant receptacle, of a valve mechanism arranged in said receptacle adapted to be affected by changes of the level of the lubricant in said receptacle, said valve mechanism coöperating with said lifting means whereby said means becomes inoperative when said lubricant supply goes below a predetermined level.

2. In a hydrocarbon motor, the combination with a carbureter, a source of fuel supply arranged at a lower level than said carbureter, means for lifting fuel from said source to said carbureter, and a source of lubricant supply, of means for connecting said sources comprising a valve device affected by changes of liquid level in said second source, means connecting said first source with said lifting means, the arrangement being such that said lifting means becomes inoperative when the lubricant supply goes below a predetermined level.

In testimony whereof I affix my signature in the presence of two witnesses.

SIDNEY D. WALDON.

Witnesses:
C. B. ELDREDGE,
F. L. DAVIS.